United States Patent [19]

Davis

[11] Patent Number: 4,872,795
[45] Date of Patent: Oct. 10, 1989

[54] NUT ASSEMBLY WITH ROTATABLE SLEEVE FOR TAKING UP BACKLASH

[75] Inventor: Evy P. Davis, Crystal Lake, Ill.
[73] Assignee: Dana Corporation, Toledo, Ohio
[21] Appl. No.: 243,332
[22] Filed: Sep. 9, 1988
[51] Int. Cl.$^4$ .................. F16B 37/00; F16H 55/18
[52] U.S. Cl. .................... 411/433; 411/432; 74/441; 74/459; 74/527
[58] Field of Search ............ 411/433, 432, 227, 228; 74/441, 459, 527

[56] References Cited

U.S. PATENT DOCUMENTS

| | | | |
|---|---|---|---|
| 697,332 | 4/1902 | Doney | 74/441 |
| 1,383,239 | 6/1921 | Roland | 74/441 |
| 2,919,596 | 1/1960 | Kuehl | 74/441 |
| 3,001,414 | 9/1961 | Bourne | 74/441 |
| 3,186,249 | 6/1965 | Lanzenberger | 74/441 |
| 4,002,083 | 1/1977 | Glicken | 74/459 |
| 4,082,925 | 4/1978 | Hufford | 74/527 X |
| 4,454,784 | 6/1984 | Shimano | 74/527 X |

FOREIGN PATENT DOCUMENTS 1061282  4/1954  France ................ 74/441

Primary Examiner—Gary L. Smith
Assistant Examiner—F. Saether
Attorney, Agent, or Firm—Leydig, Voit & Mayer, Ltd.

[57] ABSTRACT

A nut assembly comprises two end-to-end nuts threaded onto a screw and coupled by splines which prevent relative rotation between the nuts while permitting relative axial movement. A sleeve surrounds the nuts and is threaded onto one of the nuts. The other nut is formed with ratchet teeth adapted to fit into angularly spaced notches in the sleeve. When the sleeve is rotated relative to the nuts, it forces the nuts away from one another to take up backlash between the nuts and the screw. During such rotation, the teeth ratchet into and out of successive notches and ultimately prevent relative rotation between the sleeve and the nuts during normal service use.

9 Claims, 1 Drawing Sheet

NUT ASSEMBLY WITH ROTATABLE SLEEVE FOR TAKING UP BACKLASH

BACKGROUND OF THE INVENTION

This invention relates generally to a linear actuator in the form of a threaded screw and a nut assembly adapted to move along the screw when the screw is rotated. A device of this general type is disclosed More specifically, the invention pertains to a linear actuator in which the nut assembly is defined by two end-to-end nuts. One of the nuts carries essentially all of the load when the screw is rotated in one direction while the other nut carries substantially the entire load when the screw is rotated in the opposite direction. In a nut assembly of this type, it is desirable to preload the nuts in opposite directions along the screw in order to take up backlash between the threads of the screw and the threads of the nuts and thereby enable precise positioning of the component carried by the nut assembly. Various arrangements for preloading the nuts are known but, for the most part such arrangements are complex and relatively expensive and do not lend themselves to quick and easy adjustment in the field.

SUMMARY OF THE INVENTION

The general aim of the present invention is to provide a new and improved nut assembly capable of having its preload adjusted in a rapid and simple manner, capable of being adjusted in comparatively fine increments and capable of being manufactured at relatively low cost.

A more detailed object of the invention is to achieve the foregoing by providing a nut assembly in which a sleeve is telescoped over the two nuts in a novel manner and may be turned manually to adjust the preload on the nuts and to take up backlash when the threads of the screw and nuts wear.

In even a more specific sense, the invention resides in a nut assembly in which the sleeve is threadably connected to one of the nuts, is supported to ratchet relative to the other nut, and serves to force the nuts apart when rotated in one direction relative to the nuts.

These and other objects and advantages of the invention will become more apparent from the following detailed description when taken in conjunction with the accompanying drawings.

DETAILED DESCRIPTION OF THE PREFERRED EMBODIMENT

Figure 1:
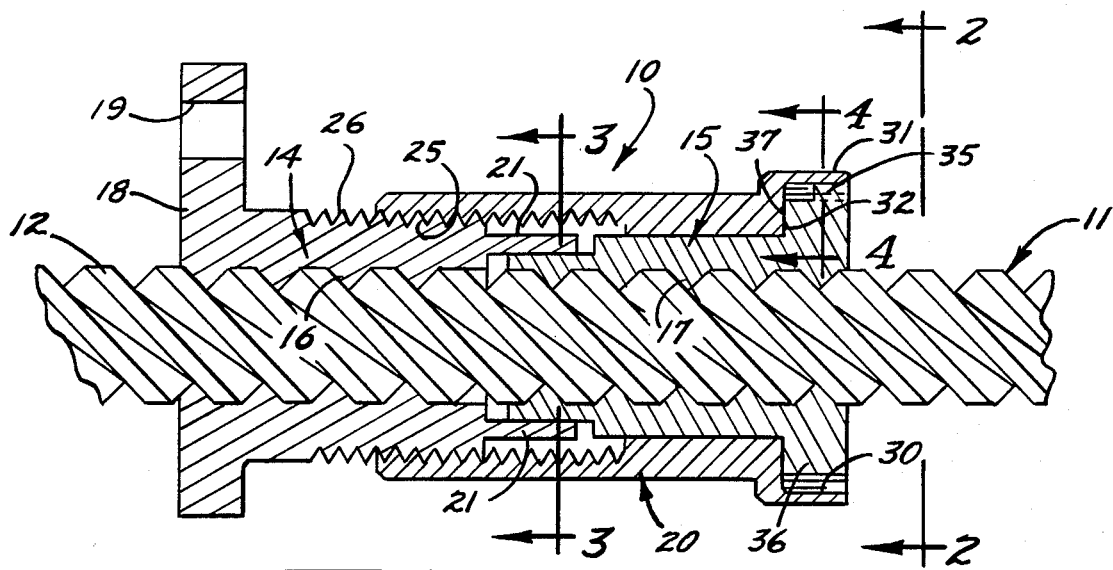
FIG. 1 is a cross-section taken axially through a new and improved nut assembly incorporating the unique features of the present invention and shows the nut assembly installed on a typical screw.

For purposes of illustration, the invention has been shown in the drawings as incorporated in a nut assembly 10 for use with an elongated screw 11. When the screw is rotated relative to the nut assembly, the latter travels axially relative to the screw. The screw may be of the same general type as disclosed in Kopp U.S. Pat. No. 3,656,358 and has multiple threads 12 (herein, five threads) extending along its length and all formed on the same helix angle.

The nut assembly 10 comprises first and second nuts 14 and 15 disposed in end-to-end relation and formed with internal threads 16 and 17, respectively, which mate with the threads 12 of the screw 11. In this instance, the nuts are molded from a relatively hard plastic such as Delrin. A generally triangular mounting flange 18 is molded integrally with and projects radially from the outboard end of the nut 14 and is formed with three angularly spaced holes 19 which are adapted to receive fasteners (not shown) for connecting the nut assembly to a movable element such as a component of a business machine.

Normally, the nuts 14 and 15 are held against rotation relative to one another and are held in a rotationally stationary position in space. The screw 11 normally is held in an axially fixed position. When the screw is rotated first in one direction and then the other, the nut assembly 10 traverses back and forth along the screw. The threads 16 and 17 of the nuts are pressed against the threads 12 of the screw in such a manner that one of the nuts carries essentially all of the load when the screw is rotated in one direction while the other nut carries essentially all of the load when the screw is rotated in the opposite direction.

In order for the nut assembly 10 to function effectively, it is necessary to maintain tight and backlash-free engagement between the threads 16 and 17 of the nuts 14 and 15 and the threads 12 of the screw 11. As the threads wear, it is necessary to adjust the nut assembly on the screw in order to take up the clearance created by such wear.

In accordance with the present invention, the nuts 14 and 15 are uniquely constructed and the assembly 10 is equipped with a novel and extremely simple sleeve 20 which may be quickly and easily adjusted to take up clearance between the threads 16 and 17 of the nuts and the threads 12 of the screw 11. Such adjustment may be made without disassembling any parts of the nut assembly, without removing the screw from the nut assembly and without disconnecting the nut assembly from the component adapted to be driven by the nut assembly. As a result, less time and effort are required to adjust the nut assembly than is the case with prior nut assemblies of the same general type.

Figure 3:
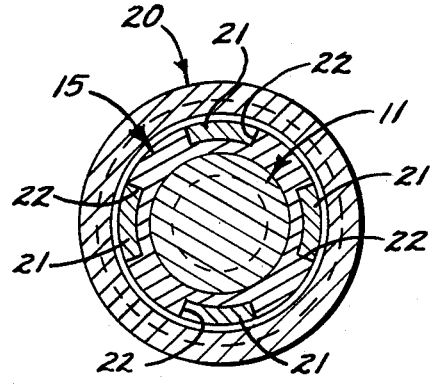

More specifically, the nut assembly 10 includes means for coupling the nuts 14 and 15 against relative rotation while permitting the nuts to move axially relative to one another. Herein, these means comprise four angularly spaced fingers 21 (FIGS. 1 and 3) formed integrally with and projecting axially from the inboard end of the nut 14. The fingers are received with a snug telescopic fit in four angularly spaced grooves 22 (FIG. 3) formed in the inboard end portion of the nut 15. The grooves 22 open radially out of the periphery of the nut 15 and also open axially out of the inboard end of the nut 15. In effect, the fingers 21 and grooves 22 define a set of splines which keep the nut 14 from rotating relative to the nut 15 while permitting the nut 14 to move axially toward and away from the nut 15.

The adjusting sleeve 20 also is molded of Delrin and is telescoped with the nuts 14 and 15 in bridging relation with the gap between the nuts. Pursuant to the invention, one end portion of the sleeve is formed with an internal thread 25 (FIG. 1) which is screwed onto an external thread 26 formed on the outer periphery of the inboard end portion of the nut 14. In this particular instance, each thread is ⅝ inches in diameter and includes eighteen threads per inch. If the nut 14 is held stationary and the sleeve 20 is rotated, the sleeve moves axially relative to the nuts 14 and 15 by virtue of the coaction between the threads 25 and 26.

Figure 2:
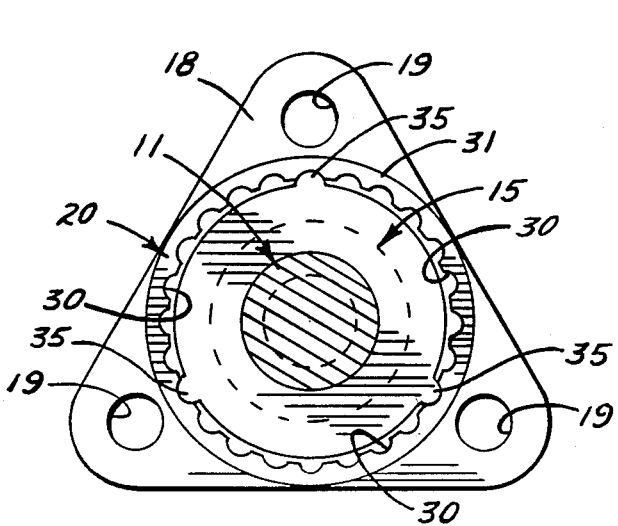
FIGS. 2 and 3 are cross-sections taken substantially along the lines 2—2 and 3—3, respectively, of FIG. 1.

Further in keeping with the invention, the nut 15 and the sleeve 20 are formed with detent means which coact with one another to normally prevent relative rotation between the nut 15 and the sleeve 20 but which release and permit such relative rotation when the nut 14 is held stationary and the sleeve is rotated to take up backlash. In the present instance, the detent means comprise several (e.g., twenty-four) angularly spaced keyways or notches 30 (FIGS. 2 and 4) formed in the inner side of an enlarged diameter collar 31 molded integrally with and projecting axially from the right end 32 of the sleeve. The notches 30 are spaced equally around the inner peripheral wall of the collar 31 and open both in a radially inward direction and in an axial direction. Each notch is generally arcuate in shape.

The present detent means further include three teeth 35 (FIGS. 2 and 4) spaced angularly around the outer periphery of a flange 36 molded integrally with and projecting radially outwardly from the outboard end of the nut 15. The flange 36 is received in the collar 31 and its inboard side defines an axially facing shoulder 37 (FIG. 1) which abuts the extreme right end 32 of the sleeve 20.

Figure 4:
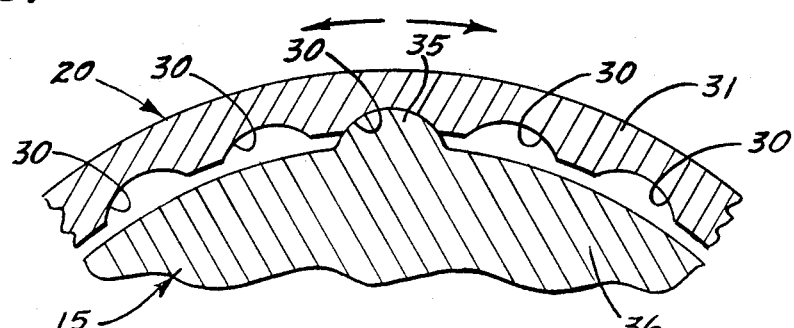
FIG. 4 an enlarged fragmentary cross-section taken substantially along the line 4—4 of FIG. 1.

As shown in FIG. 4, each tooth 35 is arcuate and corresponds generally in shape to the shape of the notches 30. The teeth are received in the notches with a snug but slidable fit and permit the sleeve 20 to move axially relative to the nut 15 until the sleeve end 32 abuts the shoulder 37. The coacting notches and teeth, however, normally lock the nut 15 and the sleeve 20 against relative rotation.

With the foregoing arrangement, the nut assembly 10 is installed on the screw 11 by threading the screw into the nut 14 from the left end thereof, the right end of the screw initially being left at a position just short of the start of the fingers 21. The sleeve 20 then is threaded part way (e.g., about half-way) onto the inboard end portion of the nut 14. Thereafter, the nut 15 is telescoped into the sleeve 20. As an incident thereto, the grooves 22 slip into telescoping relation with the fingers 21 and, in addition, the teeth 35 slip into telescoping relation with the notches 30. The screw 10 then is threaded through the nut 15.

As initially installed, the nut assembly 10 usually is only in loose engagement with the screw 11. To take up the clearance between the threads 12 of the screw 11 and the threads 16 and 17 of the nuts 14 and 15, the sleeve 20 is manually rotated in a counterclockwise direction (FIGS. 2 to 4) while the nut 14 is held rotationally stationary. During such rotation, the teeth 35 ratchet first into and then out of successive notches 30 to permit turning of the sleeve 20. As the sleeve turns, it moves axially from left to right along the nuts 14 and 15. Such axial movement is permitted by virtue of the axially slidable fit between the notches 30 and the teeth 35.

The nut assembly 10 remains loose on the screw 11 until the sleeve 20 has been turned counterclockwise relative to the nuts 14 and 15 sufficiently far to bring the right end 35 of the sleeve into engagement with the axially facing shoulder 37 of the nut 15. With further turning of the sleeve following such engagement, the right end 35 of the sleeve acts through the shoulder 37 to force the nut 15 to the right relative to the screw 11.

At the same time, the sleeve acts through the threads 25 and 26 to force the nut 14 to the left relative to the screw. As a result, the right flanks of the threads 17 in the nut 15 are loaded against the left flanks of the threads 12 of the screw 11 while the left flanks of the threads 16 in the nut 14 are loaded against the right flanks of the screw threads 12. This causes the left nut 14 to carry essentially all of the load when the nut assembly 10 is moved from left to right while the right nut carries substantially the entire load when the nut assembly is moved in the opposite direction.

As the sleeve 20 is turned still further in a counterclockwise direction, it continues to separate the nuts 14 and 15 axially from one another and cause the nuts to engage the screw thread 12 even more tightly. Counterclockwise turning of the sleeve is stopped when the nuts are sufficiently tight to cause translation of the assembly 10 only when torque exceeding a predetermined magnitude is applied to the screw 11.

After the screw 11 and the nut assembly 10 have been placed in service use, wear of the threads 12, 16 and 17 causes backlash to develop. With the present invention, the backlash can be eliminated simply by ratcheting the sleeve 20 counterclockwise while holding the nut 14 rotationally stationary. As a result of such rotation, the nuts 14 and 15 are spread even further apart so as to take up the backlash. With the present arrangement where there are eighteen threads 25 and 26 per inch and twenty-four notches 30, counterclockwise rotation of the sleeve 20 through 1/24 of a revolution or through a distance causing the teeth 35 to enter the immediately adjacent notches 30 forces the nuts apart by a distance of 0.002". By making the threads 25, 26 and the notches 30 of a finer pitch, an even finer degree of adjustment can be achieved.

From the foregoing, it will be apparent that the present invention brings to the art a new and improved nut assembly 10 having only three components, namely, the two molded nuts 14 and 15 and the molded sleeve 20. As a result, the assembly can be manufactured at relatively low cost. Importantly, backlash can be taken up in small increments simply by manually turning the sleeve 20. There is no need to assemble or disassemble any components in order to effect the adjustment and thus the adjustment may be achieved very quickly.

I claim:

1. A nut assembly adapted to be threadably connected with a screw and movable axially relative to the screw as an incident to relative rotation between the nut assembly and the screw, said nut assembly comprising first and second nuts disposed end-to-end with one another and having threads adapted to mate with the thread of the screw, connecting means coupling said nuts against relative rotation while permitting the nuts to move axially relative to one another, a sleeve telescoped with said nuts and having one end portion threadably connected to said first nut whereby said sleeve moves axially relative to said nuts when said sleeve is rotated relative to said nuts, coacting means on said second nut and on the other end portion of said sleeve and engaging one another in such a manner as to tend to force said second nut axially away from said first nut when said sleeve is rotated in one direction relative to said nuts, a plurality of first detent means spaced angularly from one another around one of said second nut and said sleeve, second detent means carried by the other of said second nut and said sleeve, said second detent means normally being axially slidably engaged with certain ones of said first detent means and normally coupling said sleeve and said second nut against relative rotation, and said second detent means releasing said certain ones of first detent means and then engaging different ones of said first detent means when said sleeve is rotated relative to said nuts with torque of sufficient magnitude to overcome the rotational coupling effect of said certain ones of said detent means.

2. A nut assembly as defined in claim 1 in which said first detent means comprise a series of angularly spaced and radially opening notches, said second detent means comprising a series of angularly spaced and radially projecting teeth extending into certain ones of said notches.

3. A nut assembly as defined in claim 2 in which said notches are formed in said sleeve and open radially inwardly, said teeth being formed on said second nut and projecting radially outwardly.

4. A nut assembly as defined in claim 3 in which each of said notches has at least one axially facing open end in order to permit said teeth to be slid axially into said notches.

5. A nut assembly as defined in claim 1 in which said connecting means comprise angularly spaced and axially spaced fingers formed on one of said nuts, and angularly spaced and axially opening grooves formed in the other of said nuts and sized to snugly but slidably receive said fingers.

6. A nut assembly as defined in claim 1 in which said coacting means comprise a first axially facing surface on said sleeve and further comprise a second axially facing surface on said second nut and opposing said first surface.

7. A nut assembly adapted to be threaded onto a screw and movable axially relative to the screw as an incident to relative rotation between the nut assembly and the screw, said nut assembly comprising first and second nuts disposed end-to-end with one another and having threads adapted to mate with the thread of the screw, spline means on said nuts and coupling said nuts against relative rotation while permitting the nuts to move axially relative to one another, a sleeve telescoped over said nuts and having one end portion threaded onto said first nut, a radially projecting and axially facing shoulder on said second nut, the opposite end of said sleeve engaging said shoulder and tending to force said first and second nuts apart axially when said sleeve is rotated in one direction relative to said nuts, a series of radially inwardly opening notches formed in and spaced angularly around said sleeve, a series of radially outwardly projecting teeth carried by and spaced angularly around said second nut, said teeth being received with an axially slidable fit in angularly alined ones of said notches and normally coupling said sleeve and said second nut against relative rotation while permitting said sleeve to move axially relative to said second nut, and said teeth ratcheting out of said angularly alined ones of said notches and into other ones of said notches when said sleeve is rotated relative to said nuts with sufficient force to overcome the coupling effect between said teeth and said angularly alined ones of said notches.

8. A nut assembly as defined in claim 7 in which each of said notches has at least one axially facing open end in order to permit said teeth to be slid axially into said notches.

9. A nut assembly as defined in claim 7 in which said spline means comprise angularly spaced and axially spaced fingers formed on one of said nuts, and angularly spaced and axially opening grooves formed in the other of said nuts and sized to snugly but slidably receive said fingers.

* * * * *